United States Patent
Kim et al.

(10) Patent No.: US 12,255,491 B2
(45) Date of Patent: Mar. 18, 2025

(54) POWER LOSS PROTECTION INTEGRATED CIRCUIT USING LOW VOLTAGE CAPACITOR

(71) Applicant: FADU Inc., Seoul (KR)

(72) Inventors: Seonho Kim, Suwon-si (KR); Jinup Lim, Seoul (KR); Jongchul Chae, Hwaseong-si (KR); Kichang Jang, Seoul (KR)

(73) Assignee: FADU Inc., Seoul (KR)

( * ) Notice: Subject to any disclaimer, the term of this patent is extended or adjusted under 35 U.S.C. 154(b) by 6 days.

(21) Appl. No.: 18/351,739

(22) Filed: Jul. 13, 2023

(65) Prior Publication Data
US 2024/0063657 A1    Feb. 22, 2024

Related U.S. Application Data

(60) Provisional application No. 63/399,791, filed on Aug. 22, 2022.

(30) Foreign Application Priority Data

Aug. 22, 2022   (KR) .................. 10-2022-0104603

(51) Int. Cl.
   *H02J 9/06*   (2006.01)
(52) U.S. Cl.
   CPC .................... *H02J 9/068* (2020.01)

(58) Field of Classification Search
   CPC ...... H02J 9/00; H02J 9/068; H01H 2300/018; Y10T 307/615
   USPC .......................................... 307/64
   See application file for complete search history.

(56) References Cited

U.S. PATENT DOCUMENTS

2011/0001462 A1*  1/2011  Couleur ............... H02M 3/155
                                                   323/289

OTHER PUBLICATIONS

TPS61094 60-nA Quiescent Current Boost Converter with Supercap Management. *Texas Instruments*. Jan. 2021.
Korean office action issue on Nov. 4, 2022 in corresponding Korean Patent application No. 10-2022-0104603 (4 pages in Korean).
Korean Notice of Allowance issued on Mar. 15, 2023 in corresponding Korean Patent application No. 10-2022-0104603 (3 pages in Korean).

* cited by examiner

*Primary Examiner* — Hal Kaplan
(74) *Attorney, Agent, or Firm* — NSIP Law

(57) ABSTRACT

Disclosed is a power loss protection integrated circuit. According to one embodiment, the power loss protection integrated circuit includes a buck/boost converter controller that operates in buck mode in a normal power supply state such that a portion of the power is used to store energy in a low voltage capacitor and operates in boost mode when the power supply is cut off such that the energy charged in the low voltage capacitor is utilized to supply emergency power to a main system.

7 Claims, 8 Drawing Sheets

POWER LOSS PROTECTION INTEGRATED CIRCUIT USING LOW VOLTAGE CAPACITOR

CROSS-REFERENCE TO RELATED APPLICATIONS

This application claims the benefit under 35 USC § 119(e) of U.S. Provisional Application No. 63/399,791 filed on Aug. 22, 2022, and the benefit under 35 USC § 119(a) of Korean Patent Application No. 10-2022-0104603 filed on Aug. 22, 2022, in the Korean Intellectual Property Office, the entire disclosures of which are incorporated herein by reference for all purposes.

BACKGROUND OF THE INVENTION

1. Field of the Invention

The present invention relates to a power loss protection integrated circuit using a low voltage capacitor, and more specifically to a circuit for storing energy in a low voltage capacitor in a normal power supply state and utilizing the energy charged in the low voltage capacitor to supply emergency power to a main system when the power supply is cut off.

2. Description of the Related Art

In general, a memory system including memory devices and a memory controller operates when power is supplied from the outside. Thus, data being processed may be lost when the power supply to the memory system is unintentionally cut off. In order to cope with such an emergency situation, the memory system includes an auxiliary power supply that stores energy in a capacitor when power is normally supplied to the memory system, immediately detects a situation in which the power supply is cut off, and uses the energy pre-charged in the capacitor to supply emergency power.

High voltage capacitors such as electrolytic capacitors, tantalum capacitors, and ceramic capacitors are used in conventional auxiliary power supplies. The energy of a capacitor is proportional to the square of the voltage. The use of a high voltage capacitor maximizes the voltage to increase the total amount of energy. High voltage capacitors have a low capacitance per unit area and a high withstand voltage and are expensive. Accordingly, an auxiliary power supply using a high voltage capacitor should use a high voltage device. Further, since the high voltage device has its own very large size, the chip size increases, inevitably resulting in a complex design.

There is thus an urgent need for a solution to the problems of conventional auxiliary power supplies using high voltage capacitors.

SUMMARY OF THE INVENTION

The present invention has been made in view of the problems of the prior art and one aspect of the present invention provides a power loss protection integrated circuit in which a buck/boost converter controller operates in buck mode in a normal power supply state such that a portion of the power is used to store energy in a low voltage capacitor and operates in boost mode when the power supply is cut off such that the energy charged in the low voltage capacitor is utilized to supply emergency power to a main system.

A further aspect of the present invention is to provide a power loss protection integrated circuit including a buck converter controller installed therein wherein when power is normally supplied, the buck converter controller bucks down the voltage and applies the bucked down voltage to a buck/boost converter controller to charge a low voltage capacitor.

Another aspect of the present invention is to provide a power loss protection integrated circuit including two different types of buck converter controllers installed therein wherein when power is normally supplied, an output voltage of a first buck converter is used to apply a voltage to a buck/boost converter controller for energy storage in a low voltage capacitor and the first buck converter and a second buck converter are used to supply different levels of output voltages to a main system.

A power loss protection integrated circuit according to one embodiment of the present invention is constructed to use an external low voltage capacitor as an emergency power source that supplies emergency power to a main system and includes: a current switching unit forming an electrical path between an external power source and the main system in a normal state in which input power is applied from the external power source and interrupting the electrical path in an emergency state in which the input power is interrupted; and a buck/boost converter unit including a buck/boost converter switching circuit including two first switching devices connected to one node connected to an external first inductor and a buck/boost converter controller operating as a buck converter or a boost converter in conjunction with the buck/boost converter switching circuit, wherein the buck/boost converter unit operates as a buck converter that receives a first voltage output from the electrical path in the normal state and outputs a second voltage relatively lower than the first voltage to charge the low voltage capacitor and operates as a boost converter that receives a third voltage output from the low voltage capacitor in the emergency state and outputs a fourth voltage relatively higher than the third voltage to supply emergency power.

In the power loss protection integrated circuit, power output from the current switching unit may be supplied to the main system in the normal state.

In the power loss protection integrated circuit, the current switching unit may include an electronic fuse (eFuse).

In the power loss protection integrated circuit, the first voltage may be output from the current switching unit.

The power loss protection integrated circuit may further include a first buck converter unit including a first buck converter switching circuit including two second switching devices connected to one node connected to an external second inductor and a first buck converter controller operating as a first buck converter in conjunction with the first buck converter switching circuit, wherein the first buck converter unit receives a fifth voltage output from the current switching unit in the normal state and outputs the first voltage relatively lower than the fifth voltage.

The power loss protection integrated circuit may further include a second buck converter unit including a second buck converter switching circuit including two third switching devices connected to one node connected to an external third inductor and a second buck converter controller operating as a second buck converter in conjunction with the second buck converter switching circuit, wherein the second buck converter unit receives the fifth voltage in the normal state, outputs a sixth voltage relatively lower than the fifth voltage, and does not operate in the emergency state.

In the power loss protection integrated circuit, the buck/boost converter switching circuit may further include one switching device and the buck/boost converter unit may operate as a multiple boost converter that receives the third voltage in the emergency state and multi-outputs a seventh voltage relatively higher than the third voltage together with the fourth voltage to supply emergency power and may not operate in the emergency state.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The power loss protection integrated circuit of the present invention is structured such that an input voltage is stepped down to store energy in a capacitor at a low voltage. Due to this structure, the buck/boost converter controller and its peripheral circuits can be designed as low voltage devices rather than high voltage devices. Therefore, the power loss protection integrated circuit of the present invention can contribute to a reduction in chip area, can be simplified in design, and can be protected in advance from defects caused by high voltages compared to conventional auxiliary power supplies using high voltage devices.

When a conventional auxiliary power supply uses energy stored in a capacitor to supply power to a main system in an emergency situation, the level of an output voltage is additionally changed to adapt it to a voltage level of the main system. In contrast, the installation of the buck converter controller in the power loss protection integrated circuit of the present invention can minimize the number of voltage level changes. Therefore, the use of the power loss protection integrated circuit according to the present invention can reduce power loss compared to the use of conventional auxiliary power supplies.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
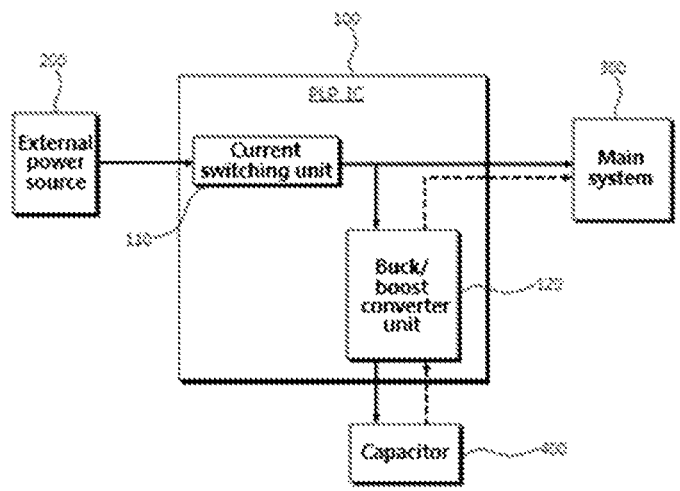
FIGS. 1 and 2 are schematic diagrams illustrating the configuration of a power loss protection integrated circuit according to a first embodiment of the present invention.

The objects, specific advantages, and novel features of the present invention will become apparent from the following detailed description and preferred embodiments in conjunction with the accompanying drawings. It should be noted that in the drawings, the same components are denoted by the same reference numerals even though they are depicted in different drawings. Although such terms as "first" and "second," etc. may be used to describe various components, these components should not be limited by above terms. These terms are used only to distinguish one component from another. In the description of the present invention, detailed explanations of related art are omitted when it is deemed that they may unnecessarily obscure the essence of the present invention.

Preferred embodiments of the present invention will now be described in detail with reference to the accompanying drawings.

Figure 2:
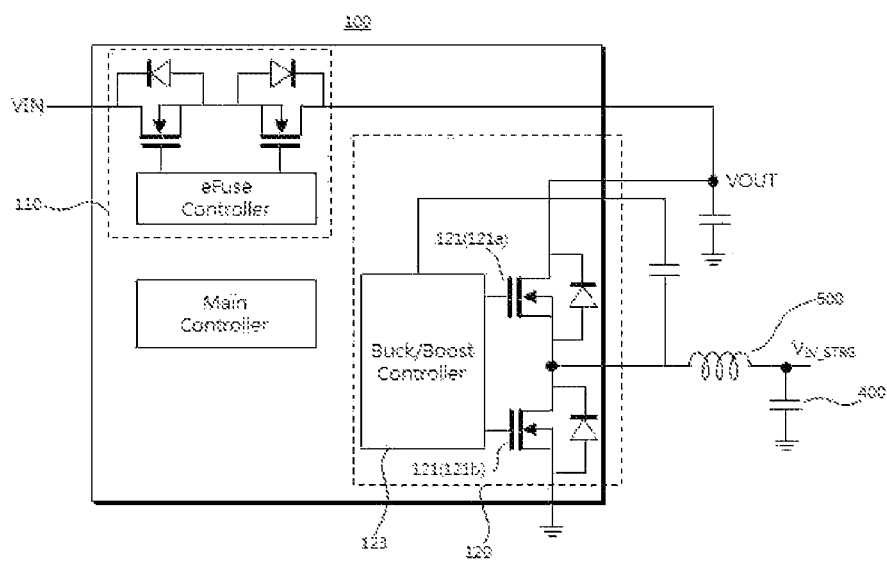
Figure 3:
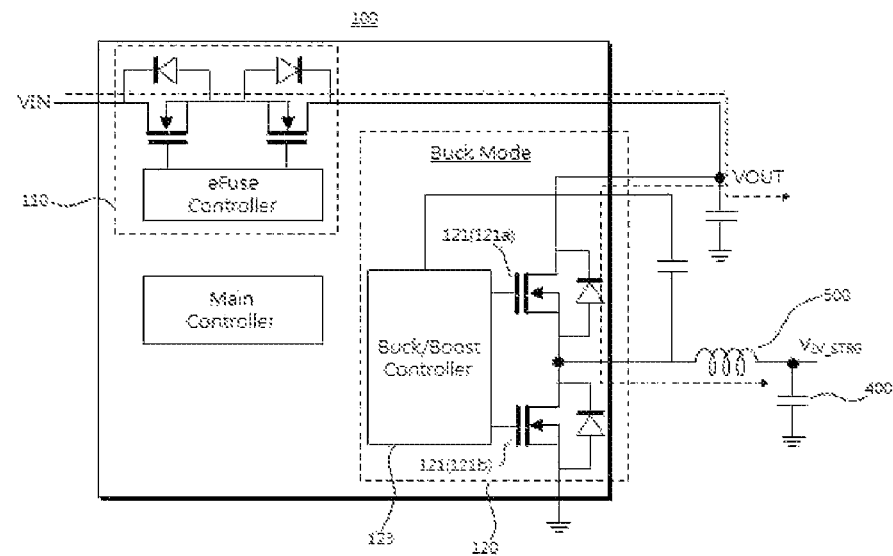
FIG. 3 illustrates the operation of the power loss protection integrated circuit according to the first embodiment of the present invention in a normal state.
Figure 4:
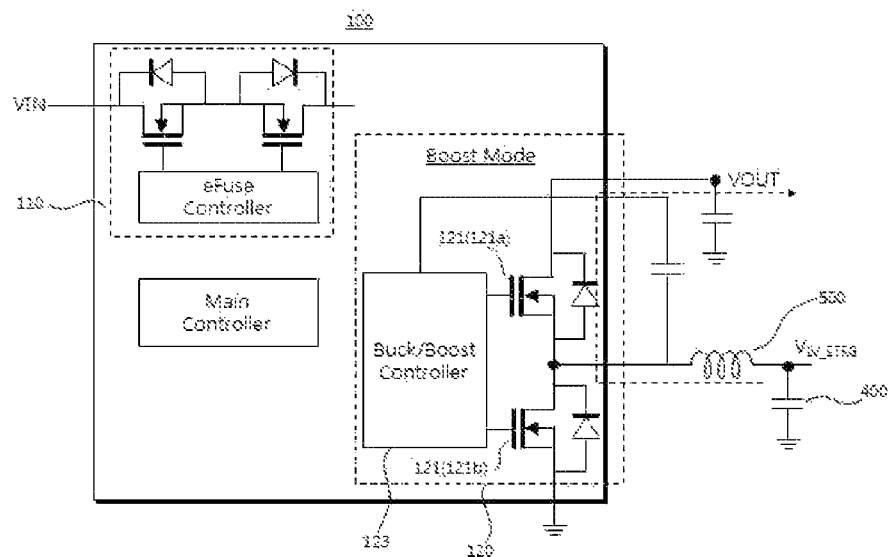
FIG. 4 illustrates the operation of the power loss protection integrated circuit according to the first embodiment of the present invention in an emergency state.

FIGS. 1 and 2 are schematic diagrams illustrating the configuration of a power loss protection integrated circuit according to a first embodiment of the present invention, FIG. 3 illustrates the operation of the power loss protection integrated circuit in a normal state, and FIG. 4 illustrates the operation of the power loss protection integrated circuit in an emergency state.

Referring to FIGS. 1 to 4, the power loss protection integrated circuit 100 is constructed to use an external low voltage capacitor 400 as an emergency power source that supplies emergency power to a main system 300 and includes: a current switching unit 110 forming an electrical path between an external power source 200 and the main system 300 in a normal state in which input power is applied from the external power source 200 and interrupting the electrical path in an emergency state in which the input power is interrupted; and a buck/boost converter unit 120 including a buck/boost converter switching circuit 121 including two first switching devices 121a and 121b connected to one node connected to an external first inductor 500 and a buck/boost converter controller 123 operating as a buck converter or a boost converter in conjunction with the buck/boost converter switching circuit 121, wherein the buck/boost converter unit 120 operates as a buck converter that receives a first voltage output from the electrical path in the normal state and outputs a second voltage relatively lower than the first voltage to charge the low voltage capacitor 400 and operates as a boost converter that receives a third voltage output from the low voltage capacitor 400 in the emergency state and outputs a fourth voltage relatively higher than the third voltage to supply emergency power.

The power loss protection integrated circuit 100 of the present invention stores energy in the capacitor 400 in a normal power supply state and utilizes the energy charged in the capacitor 400 to supply emergency power to the main system 300 when the power supply is cut off.

The main system 300 is an assembly of devices that receives power from the power loss protection integrated circuit 100 and performs a predetermined function. As an example, the main system 300 may be a solid state drive (SSD) or may consist of elements in the SSD. An SSD is a semiconductor-based storage device and may include a power loss protection integrated circuit that can supply emergency power to prevent data being processed from being lost even in an unintentional sudden power cut off situation. In this case, the power loss protection integrated circuit supplies power to a power management device such as a PMIC in an SSD and supports such that data are stably stored in a NAND flash memory.

The power loss protection integrated circuit 100 is an integrated circuit constructed such that power is supplied to the main system 300 and at the same time a portion of the power is used to store energy in the external capacitor 400 in a situation in which the power is normally supplied from the external power source 200 and the energy stored in the capacitor 400 is used to supply emergency power to the main system 300 in an emergency situation in which the power supply is cut off.

As described above, the power loss protection integrated circuit 100 of the present invention includes a current switching unit 110 and a buck/boost converter unit 120.

The current switching unit 110 either forms or interrupts an electrical path connecting the external power source 200 and the main system 300. The current switching unit 110 can control the flow of electric current through the electrical path. The electrical path is formed and maintained only in a normal state. The normal state refers to a state in which an input voltage is applied from the external power source 200. In this state, the power loss protection integrated circuit 100 outputs a predetermined voltage in response to an input voltage and supplies the output as power to the main system 300. Meanwhile, the emergency state refers to a state in which power supply from the external power source 200 is unintentionally cut off. In this state, the current switching unit 110 interrupts (deactivates) the electrical path. When the electrical path is interrupted, the flow of electric current is also interrupted, with the result that emergency power supplied by energy stored in the external capacitor 400 is prevented from being lost along the electrical path.

The current switching unit 110 may include an electronic fuse (eFuse). An electronic fuse is an electronic switching device that controls the flow of electrical current when an installed MOSFET is turned ON/OFF. Although not illustrated, a circuit may be installed to detect whether power is supplied from the external power source 200. The circuit can detect power supply from the external power source 200 to generate a control signal and an electronic fuse (eFuse) controller can control the ON/OFF of the electronic fuse in response to the control signal. However, the current switching unit 110 is not necessarily implemented by an electronic fuse and is not particularly limited as long as it is a circuit capable of allowing or interrupting the flow of current.

As described above, the buck/boost converter unit 120 includes a buck/boost converter switching circuit 121 and a buck/boost converter controller 123.

In the buck/boost converter switching circuit 121, two first switching devices 121a and 121b are connected to one node. The first inductor 500 may be connected to the node to which the first switching devices 121a and 121b are connected. The first inductor 500 may be arranged outside the power loss protection integrated circuit 100. The first switching devices 121a and 121b may be implemented by transistors, for example, two MOSFETs that are alternately turned ON/OFF. Parasitic diodes may be attached to the MOSFETs and a bootstrap capacitor may be electrically connected between the buck/boost converter controller 123 and the first inductor 500.

The buck/boost converter controller 123 controls the ON/OFF of the first switching devices 121a and 121b and operates as a buck converter in buck mode or a boost converter in boost mode in conjunction with the first inductor 500 and the buck/boost converter switching circuit 121.

The buck/boost converter unit 120 operates as a buck converter in a normal state and as a boost converter in an emergency state.

The buck converter is a converter that steps down an input voltage and outputs the stepped-down voltage. The buck converter receives a first voltage output from the electrical path and outputs a second voltage relatively lower than the first voltage (see FIG. 3). The output second voltage charges the low voltage capacitor 400 and is stored as energy in the capacitor 400. According to one embodiment of the present invention, the power loss protection integrated circuit 100 may use power output from the current switching unit 110 as power supplied to the main system 300 in a normal state. At this time, a portion of the power is used to store energy in the capacitor 400. The first voltage may be output from the current switching unit 110. Accordingly, the buck/boost converter unit 120 operates as a buck converter in a normal state to step down the first voltage output from the current switching unit 110 and charge the capacitor 400. Since the buck/boost converter unit 120 operates as a buck converter, a low voltage capacitor should be used as the capacitor 400. The low voltage capacitor may be, for example, a supercapacitor.

For example, when a voltage of 12 V (VIN) is applied from the external power source 200 to the current switching unit 110, the current switching unit 110 supplies an output voltage of 12 V (VOUT) to the main system 300 and the buck/boost converter unit 120 operates in buck mode to step down the voltage of 12 V input from the current switching unit 110 to a voltage (e.g., 2.3 V) lower than the input voltage ($V_{LV\text{-}STRG}$) and stores energy in the low voltage capacitor 400.

The buck/boost converter unit 120 operates as a boost converter in an emergency state in which the power supply from the external power source 200 is cut off. The boost converter receives a third voltage output from the capacitor 400 and outputs a fourth voltage relatively higher than the third voltage (see FIG. 4). The output from the boost converter may supply auxiliary power to the main system 300.

In the above example, when the power supply from the external power source 200 is cut off, the buck/boost converter unit 120 operates in boost mode to boost a voltage lower than the input voltage output from the low voltage capacitor 400 to 12 V and supply emergency power (VOUT) to the main system 300. At this time, since the electrical path is interrupted by the current switching unit 110, the emergency power is protected from being lost in the direction toward the external power source 200.

Overall, the power loss protection integrated circuit 100 is structured such that an input voltage is stepped down to store energy in a capacitor at a low voltage. Due to this structure, the buck/boost converter controller and its peripheral circuits can be designed as low voltage devices. Therefore, the power loss protection integrated circuit of the present invention can contribute to a reduction in chip area, can be simplified in design, and can be protected in advance from defects caused by high voltages compared to conventional auxiliary power supplies using high voltage devices.

Figure 5:
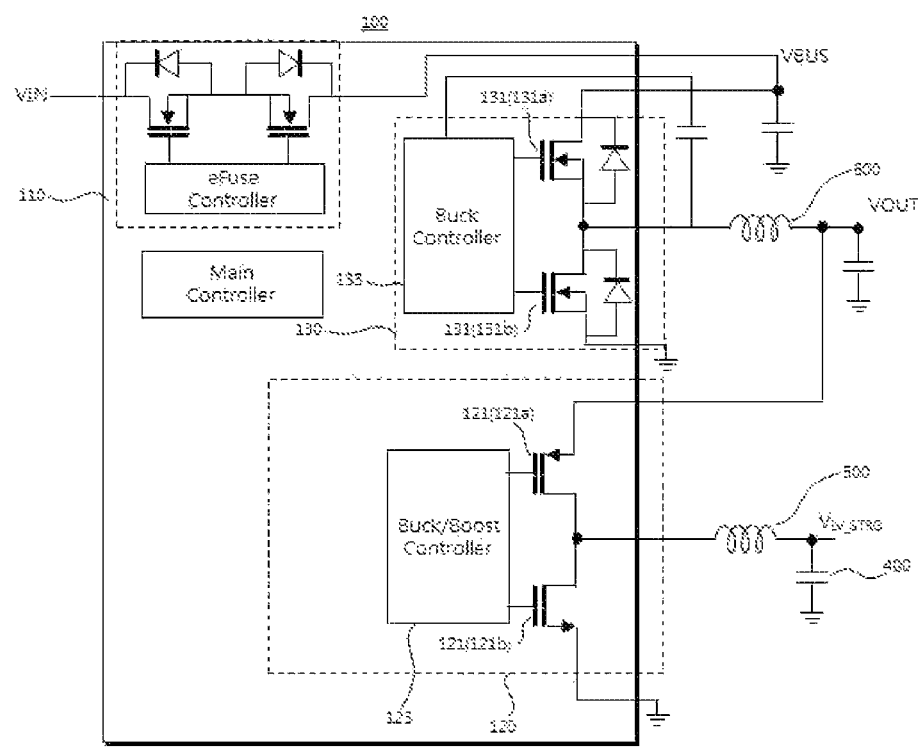
FIG. 5 is a schematic diagram illustrating the configuration of a power loss protection integrated circuit according to a second embodiment of the present invention.
Figure 6:
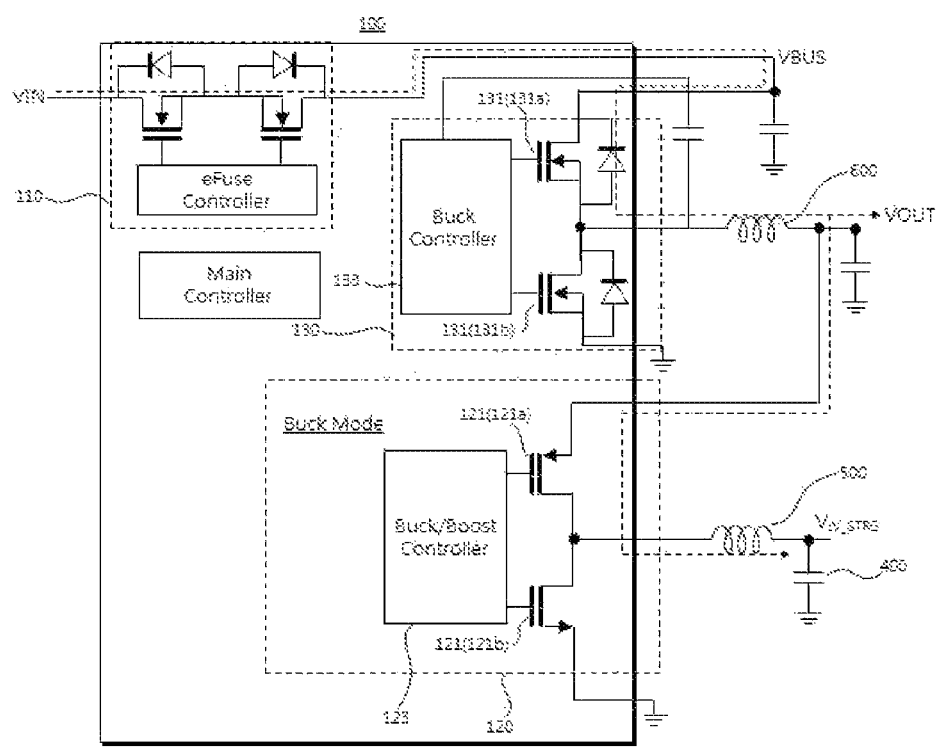
FIG. 6 illustrates the operation of the power loss protection integrated circuit according to the second embodiment of the present invention in a normal state.
Figure 7:
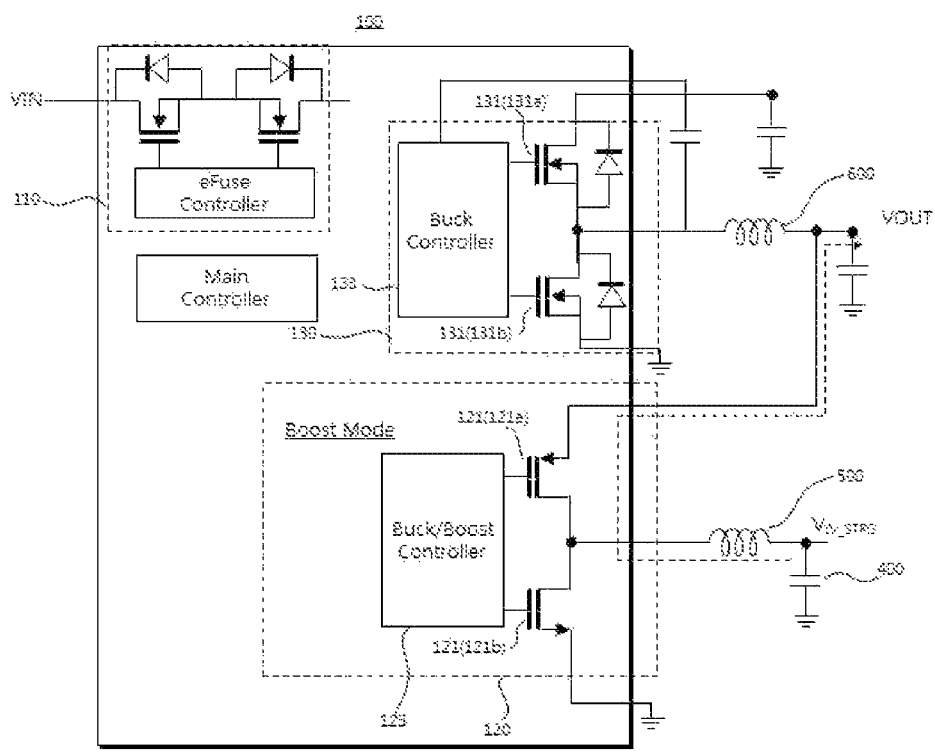
FIG. 7 illustrates the operation of the power loss protection integrated circuit according to the second embodiment of the present invention in an emergency state.

FIG. 5 is a schematic diagram illustrating the configuration of a power loss protection integrated circuit according to a second embodiment of the present invention, FIG. 6 illustrates the operation of the power loss protection integrated circuit in a normal state, and FIG. 7 illustrates the operation of the power loss protection integrated circuit in an emergency state.

As illustrated in FIGS. 5 to 7, the power loss protection integrated circuit 100 may further include a first buck converter unit 130.

The first buck converter unit 130 includes a first buck converter switching circuit 131 and a first buck converter controller 133.

The first buck converter switching circuit 131 includes two second switching devices 131a and 131b connected to one node. The second switching devices 131a and 131b may be implemented by transistors, for example, two MOSFETs that are alternately turned ON/OFF. Parasitic diodes may be attached to the MOSFETs. A second inductor 600 may be connected to the node to which the second switching devices 131a and 131b are connected. The second inductor 600 may be arranged outside the power loss protection integrated circuit 100 and a bootstrap capacitor may be electrically connected between the first buck converter controller 131 and the second inductor 600.

Unlike in the first embodiment, the buck/boost converter unit 120 may use a low voltage device instead of a high voltage device in the second embodiment. Thus, parasitic diodes and a bootstrap capacitor may be omitted from the buck/boost converter unit 120 and PMOS and an NMOS transistors may be used as the first and second switching devices 121a and 121b, respectively, in the second embodiment.

The first buck converter controller 133 controls driving of the first buck converter switching circuit 131 and operates as a buck converter in conjunction with the first buck converter switching circuit 131 and the second inductor 600.

The buck converter operated by the first buck converter controller 133 operates only in a normal state. The current switching unit 110 outputs a fifth voltage in a normal state and the first buck converter receives the fifth voltage and outputs the first voltage (see FIG. 6). At this time, the buck/boost converter unit 120 operates as a second buck converter that receives the first voltage output from the first buck converter and outputs a second voltage to charge the low voltage capacitor 400. Here, the output from the first buck converter is used as input power to the main system 300. That is, the output from the first buck converter is used as power to drive the main system 300 and a portion of the output is used to charge the low voltage capacitor 400.

Meanwhile, the first buck converter unit 130 does not operate in an emergency state and the buck/boost converter unit 120 operates as a boost converter that receives a third voltage output from the low voltage capacitor 400 and outputs a fourth voltage to supply emergency power to the main system 300 (see FIG. 7).

For example, according to the second embodiment of the present invention, the first buck converter unit 130 installed in the power loss protection integrated circuit steps down the voltage of 12 V output from the current switching unit 110 to 3.3 V or 5 V, outputs the stepped-down voltage (VOUT), and supplies the output as power to chips in an SSD (for reference, the actual input voltage to elements in an SSD is 3.3 V or 5 V), and at the same time, the buck/boost converter unit 120 operates in buck mode to step down the voltage of 3.3 V or 5 V to a voltage ($V_{LV\_STRG}$) lower than the input voltage and stores energy in the low voltage capacitor 400. The buck/boost converter unit 120 operates in boost mode in an emergency state to boost the input voltage of 2.3 V ($V_{LV\_STRG}$) supplied from the low voltage capacitor 400 to 3.3 V or 5 V (VOUT) and supply power to chips in an SSD. In this case, two voltage level changes (($V_{LV\_STRG}$)→12 V (VOUT)→3.3 V or 5 V) are required in the power loss protection integrated circuit 100 according to the first embodiment of the present invention for emergency power supply from the capacitor 400 to chips in an SSD in an emergency state. In contrast, only one voltage level change (($V_{LV\_STRG}$)→3.3 V or 5 V (VOUT)) is performed in the power loss protection integrated circuit 100 according to the second embodiment of the present invention requires, thus minimizing power loss. In addition, the buck/boost converter unit 120 of the power loss protection integrated circuit 100 according to the second embodiment of the present invention performs only low voltage conversions, including stepping down of the voltage of 3.3 V or 5 V to a voltage lower than the input voltage in a normal state and boost of the stepped down voltage to 3.3 V or 5 V in an emergency state, enabling the use of a low voltage device as the first buck converter unit 130.

Figure 8:
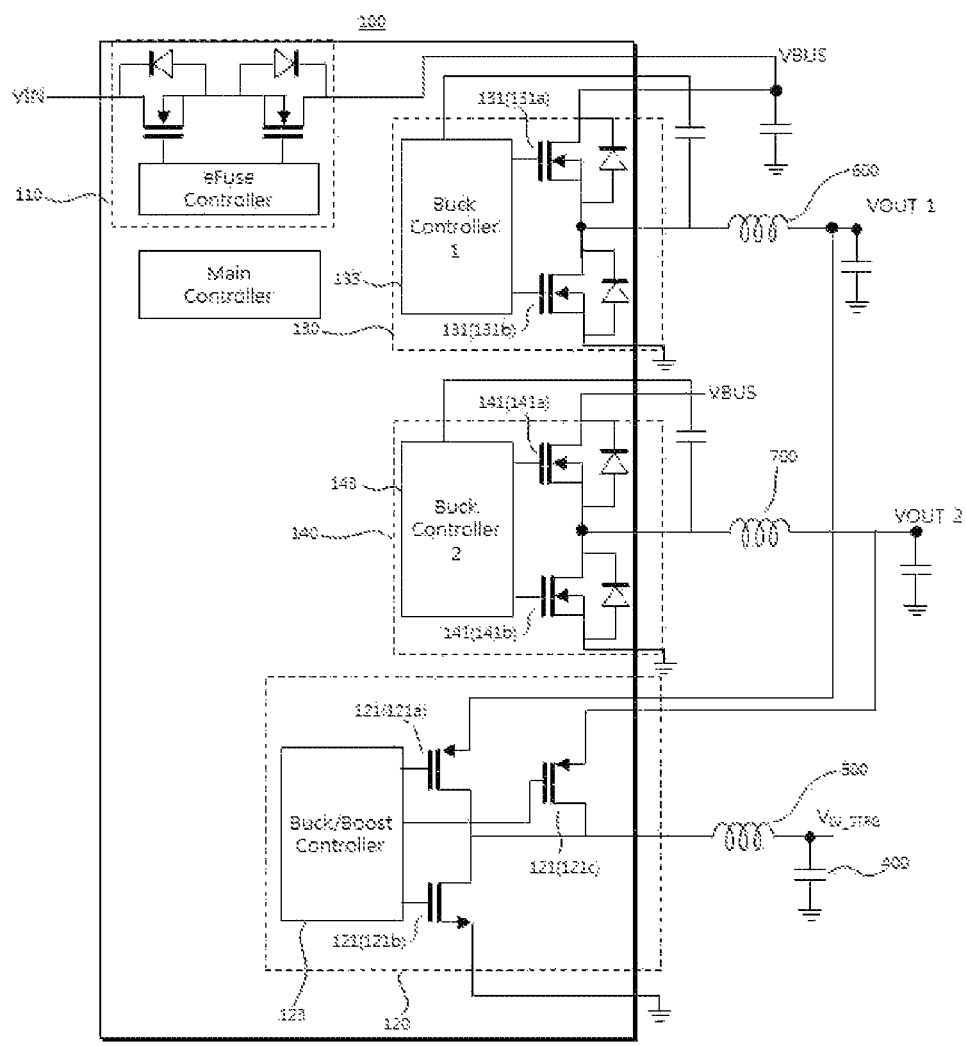
FIG. 8 is a schematic diagram illustrating the configuration of a power loss protection integrated circuit according to a third embodiment of the present invention.
Figure 9:
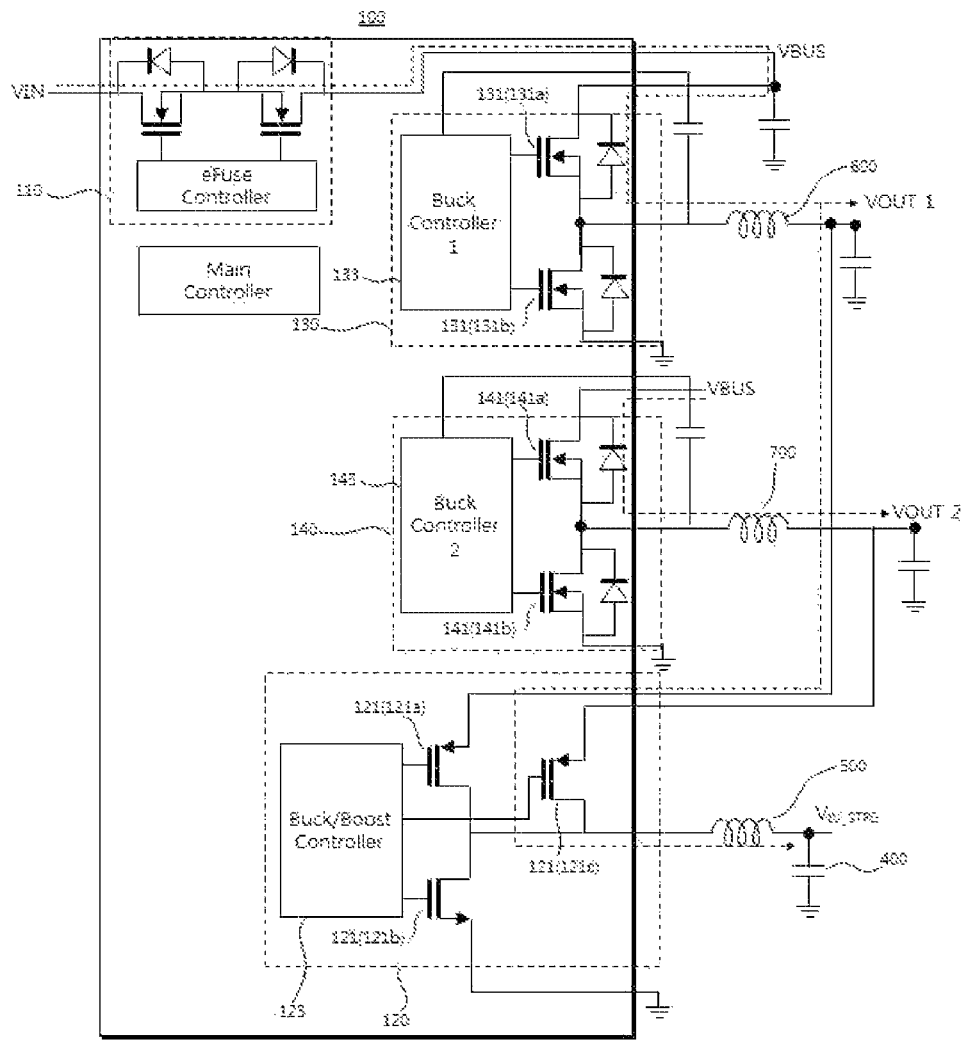
FIG. 9 illustrates the operation of the power loss protection integrated circuit according to the third embodiment of the present invention in a normal state.
Figure 10:
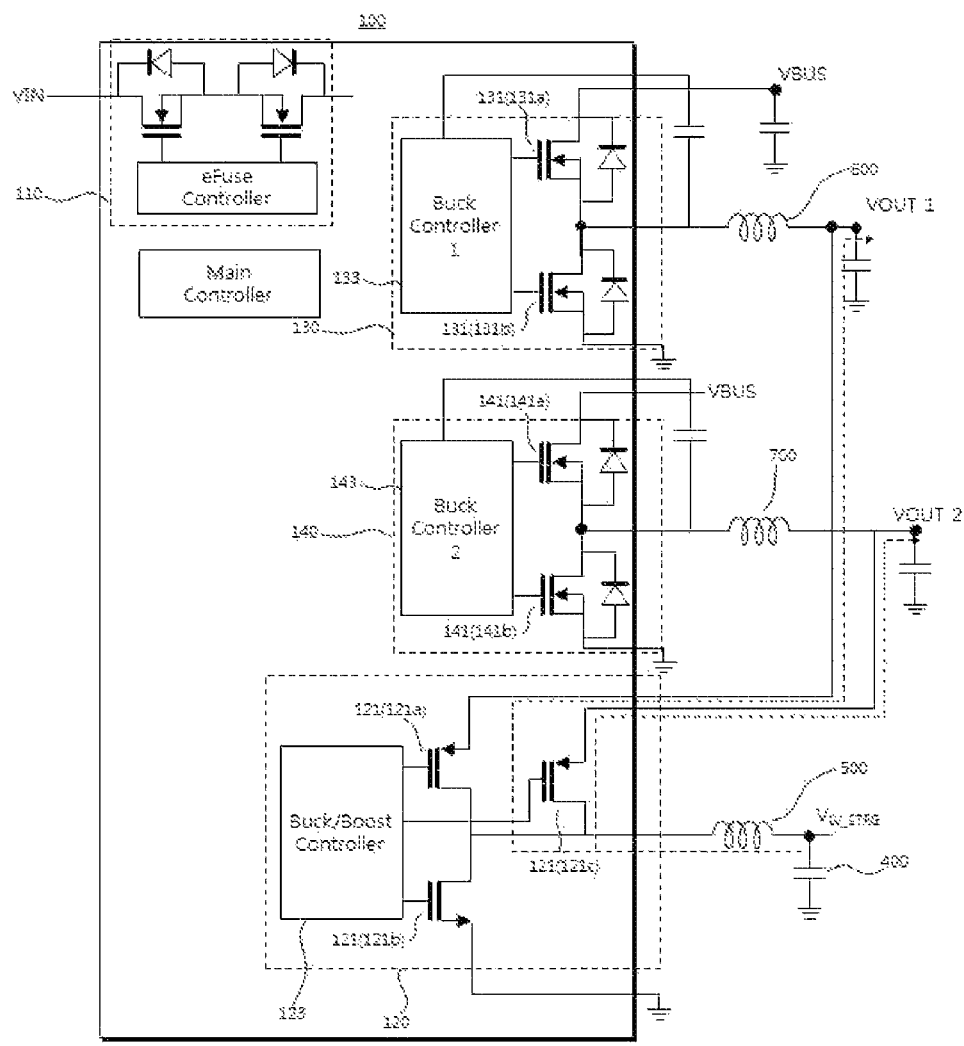
FIG. 10 illustrates the operation of the power loss protection integrated circuit according to the third embodiment of the present invention in an emergency state.

FIG. 8 is a schematic diagram illustrating the configuration of a power loss protection integrated circuit according to a third embodiment of the present invention, FIG. 9 illustrates the operation of the power loss protection integrated circuit in a normal state, and FIG. 10 illustrates the operation of the power loss protection integrated circuit in an emergency state.

As illustrated in FIGS. 8 to 10, the power loss protection integrated circuit 100 may further include a second buck converter unit 140 in addition to the first buck converter unit 130 in the second embodiment.

The second buck converter unit 140 includes a second buck converter switching circuit 141 and a second buck converter controller 143. The second buck converter switching circuit 141 and the second buck converter controller 143 correspond to the first buck converter switching circuit 131 and the first buck converter controller 133 of the first buck converter unit 130, respectively, and only a brief description thereof will be provided below.

The second buck converter switching circuit 141 includes two third switching devices 141a and 141b connected to one node. A third inductor 700 is connected to the node. The third inductor 700 may be arranged outside the power loss protection integrated circuit 100.

The second buck converter controller 143 controls the second buck converter switching circuit 141 and operates as a second buck converter in conjunction with the third inductor 700. The second buck converter together with the first buck converter operated by the first buck converter controller 133 operates only in a normal state and does not operate in an emergency state.

Referring to FIG. 9, the current switching unit 110 outputs a fifth voltage in a normal state. The first buck converter operated by the first buck converter controller 133 receives the fifth voltage and outputs the first voltage. At this time, the second buck converter operated by the second buck converter controller 143 receives the fifth voltage and outputs a sixth voltage relatively lower than the fifth voltage. The output first and sixth voltages are supplied to the main system 300. Since the devices in the main system 300 require different levels of input voltages, they can be operated using multiple input voltages including the first and sixth voltages. Meanwhile, the buck/boost converter unit 120 operates as a third buck converter that receives the first voltage output from the first buck converter and outputs a second voltage to charge the low voltage capacitor 400.

With reference to FIG. 10, in an emergency state, the first buck converter unit 130 and the second buck converter unit 140 do not operate and the buck/boost converter unit 120 operates as a boost converter that receives the third voltage output from the low voltage capacitor 400 and outputs a fourth voltage to supply emergency power to the main system 300. Here, the buck/boost converter switching circuit 121 of the buck/boost converter unit 120 may further include a switching device 121c. In this case, the buck/boost converter unit 120 may operate as a multiple boost converter that receives the third voltage and multi-outputs a seventh voltage relatively higher than the third voltage together with the fourth voltage. The output fourth and seventh voltages may correspond to the first and sixth voltages, respectively.

For example, according to the third embodiment of the present invention, the first buck converter unit 130 and the second buck converter unit 140 installed in the power loss protection integrated circuit step down the voltage of 12 V output from the current switching unit 110 to 3.3 V or 5 V and 2.8 V, output the stepped-down voltages (VOUT1 and VOUT2), and supply the outputs as power to chips in an SSD (for reference, the actual input voltages to elements in an SSD are 3.3 V or 5 V and 2.8 V), respectively, and at the same time, the buck/boost converter unit 120 operates in buck mode to step down the voltage of 3.3 V or 5 V to a voltage ($V_{LV\_STRG}$) lower than the input voltage and stores energy in the low voltage capacitor 400. The buck/boost converter unit 120 operates in multi-boost mode in an emergency state to output multiple voltages from a single input voltage. Specifically, the buck/boost converter unit 120 outputs the input voltage ($V_{LV\_STRG}$) supplied from the low voltage capacitor 400 to two voltages of 3.3 V or 5 V and 2.8 V (VOUT1 and VOUT2) and supplies power to chips in an SSD.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

EXPLANATION OF REFERENCE NUMERALS

- 100: Power loss protection integrated circuit
- 110: Current switching unit
- 120: Buck/boost converter unit
- 121: Buck/boost converter switching circuit
- 121a, 121b: First switching devices
- 123: Buck/boost converter controller
- 130: First buck converter unit
- 131: First buck converter switching circuit
- 131a, 131b: Second switching devices
- 133: First buck converter controller
- 140: Second buck converter unit
- 141: Second buck converter switching circuit
- 141a, 141b: Third switching devices
- 143: First buck converter controller
- 200: External power source
- 300: Main system
- 400: Capacitor
- 500: First inductor
- 600: Second inductor
- 700: Third inductor

What is claimed is:

1. A power loss protection integrated circuit constructed to use an external low voltage capacitor as an emergency power source that supplies emergency power to a main system and comprising: a current switching unit forming an electrical path between an external power source and the main system in a normal state in which input power is applied from the external power source and interrupting the electrical path in an emergency state in which the input power is interrupted; and a buck/boost converter unit comprising a buck/boost converter switching circuit comprising two first switching devices connected to one node connected to an external first inductor and a buck/boost converter controller operating as a buck converter or a boost converter in conjunction with the buck/boost converter switching circuit, wherein the buck/boost converter unit operates as a buck converter that receives a first voltage output from the electrical path in the normal state and outputs a second voltage lower than the first voltage to charge the low voltage capacitor and operates as a boost converter that receives a third voltage output from the low voltage capacitor in the emergency state and outputs a fourth voltage higher than the third voltage to supply emergency power.

2. The power loss protection integrated circuit according to claim 1, wherein power output from the current switching unit is supplied to the main system in the normal state.

3. The power loss protection integrated circuit according to claim 1, wherein the current switching unit comprises an electronic fuse (eFuse).

4. The power loss protection integrated circuit according to claim 1, wherein the first voltage is output from the current switching unit.

5. The power loss protection integrated circuit according to claim 1, further comprising a first buck converter unit comprising a first buck converter switching circuit comprising two second switching devices connected to one node connected to an external second inductor and a first buck converter controller operating as a first buck converter in conjunction with the first buck converter switching circuit, wherein the first buck converter unit receives a fifth voltage output from the current switching unit in the normal state and outputs the first voltage lower than the fifth voltage.

6. The power loss protection integrated circuit according to claim 5, further comprising a second buck converter unit comprising a second buck converter switching circuit comprising two third switching devices connected to one node connected to an external third inductor and a second buck converter controller operating as a second buck converter in conjunction with the second buck converter switching circuit, wherein the second buck converter unit receives the fifth voltage in the normal state, outputs a sixth voltage lower than the fifth voltage, and does not operate in the emergency state.

7. The power loss protection integrated circuit according to claim 6, wherein the buck/boost converter switching circuit further comprises one switching device and the buck/boost converter unit operates as a multiple boost converter that receives the third voltage in the emergency state and multi-outputs a seventh voltage higher than the third voltage together with the fourth voltage to supply emergency power.

* * * * *